United States Patent
Iden

[11] Patent Number: 5,079,846
[45] Date of Patent: Jan. 14, 1992

[54] FLOATING DISK COMPASS

[75] Inventor: Marlin D. Iden, Riverton, Wyo.

[73] Assignee: The Brunton Company, Riverton, Wyo.

[21] Appl. No.: 348,949

[22] Filed: May 8, 1989

[51] Int. Cl.$^5$ .................................. G01C 17/08
[52] U.S. Cl. .................................. 33/364; 33/347
[58] Field of Search ............ 33/332, 347, 354, 355 R, 33/364, 346, 352; 40/124.1, 124.4; 210/222

[56] References Cited

U.S. PATENT DOCUMENTS

| | | | |
|---|---|---|---|
| 1,309,150 | 7/1919 | Monfort | 33/355 R |
| 1,614,228 | 1/1927 | Breed | 33/364 |
| 2,511,688 | 6/1950 | Beauchamp | 33/355 |
| 2,687,577 | 8/1954 | Palotti | 33/355 R |
| 2,857,679 | 10/1958 | Le Bleu | 33/354 |
| 2,957,250 | 10/1960 | Webb | 33/355 |
| 3,068,583 | 12/1962 | Goshen | 33/364 |
| 3,544,253 | 12/1970 | Bloom et al. | 33/354 |
| 3,585,728 | 6/1971 | Ogg | 33/364 |
| 3,980,562 | 9/1976 | Nilsson | 210/222 |
| 4,175,333 | 11/1979 | Kramer | 33/355 R |
| 4,236,316 | 12/1980 | Suzuki | 33/364 |
| 4,335,521 | 6/1982 | Rutherford | 33/355 R |
| 4,404,752 | 9/1983 | Hanna | 33/347 |
| 4,581,827 | 4/1986 | Higashi | 33/355 R |
| 4,614,041 | 9/1986 | Darton et al. | 33/346 |
| 4,848,002 | 7/1989 | Carmona et al. | 33/364 |

FOREIGN PATENT DOCUMENTS

| | | | |
|---|---|---|---|
| 3537346 | 1/1987 | Fed. Rep. of Germany | 33/355 R |
| 2443665 | 8/1980 | France | 33/355 R |
| 493717 | 10/1938 | United Kingdom | 33/346 |
| 2061821 | 5/1981 | United Kingdom | 40/124.1 |
| 2226136 | 6/1990 | United Kingdom | 33/355 R |

Primary Examiner—William A. Cuchlinski, Jr.
Assistant Examiner—C. W. Fulton
Attorney, Agent, or Firm—John E. Reilly

[57] ABSTRACT

A liquid-type compass comprises a light-weight thin, flat disk of magnetic material so constructed that it is capable of floating on a liquid surface so as to be movable to orient itself in a North-South direction. A flat support provided for storing the disk when not in use is releasably secured to a support member. The support member is in the form of a small flat card containing survival instructions as well as instructions for use of the compass.

7 Claims, 1 Drawing Sheet

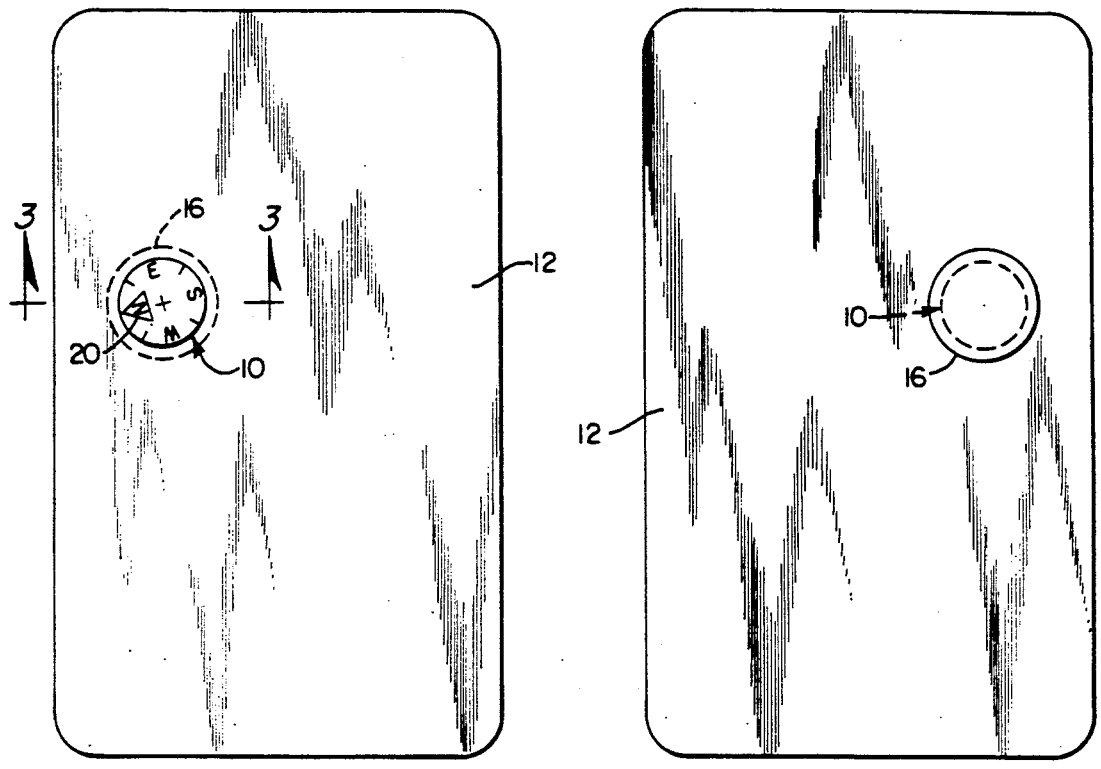
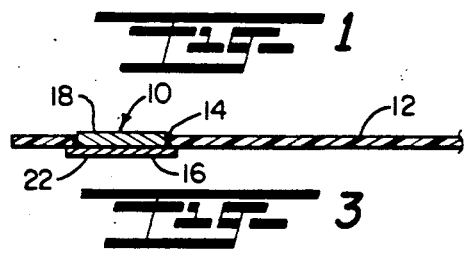
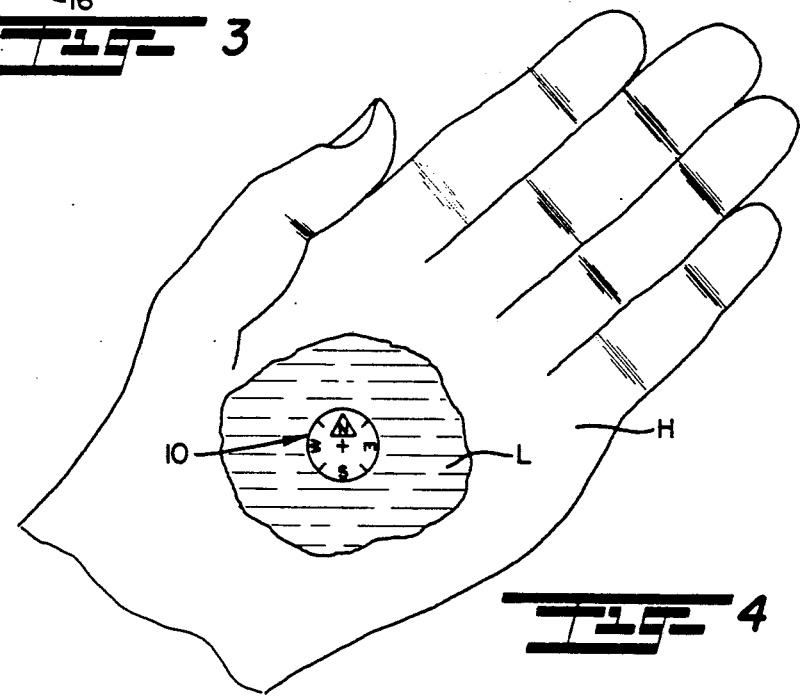

FLOATING DISK COMPASS

This invention relates to compasses; and more particularly relates to a novel and improved liquid compass disk which is particularly useful in emergency situations or as a part of a survival kit.

BACKGROUND AND FIELD OF THE INVENTION

Survival kits are made up of a number of items needed to meet certain emergency situations, such as, when one becomes lost or stranded. In those situations, a compass is one of those items which are essential to survival, and it is important that the compass as well as other items occupy a minimum of space, are extremely lightweight but are both reliable and efficient in use.

Liquid-filled compasses are becoming increasingly popular and in widespread use. Such compasses typically employ a disk supported on a bearing in a chamber containing liquid. The liquid serves to damp any tilting or rotational movement of the compass disk but at the same time the disk is free to rotate to properly orient a marker with the North magnetic pole. To this end, typically magnets are mounted on the compass disk or closely associated with the disk to cause it to be oriented when freely suspended in the liquid. However, those liquid-filled compasses which are now commercially available occupy too much space to be satisfactory for use in a survival kit. It is therefore desirable to provide for a compass disk which can be normally stored in a dry condition so as to occupy a minimum of space but when needed can be placed on a liquid surface and orient itself to provide an accurate compass reading. Further, it is desirable that the compass disk can be conveniently stored on a card no larger than a credit card and carried on one's person with instructions on the card for use of the compass when needed under emergency conditions; and for example to properly instruct one in the use of the compass disk as a liquid compass and in such a way that the compass will operate effectively with a minimum quantity of liquid or water.

Representative types of liquid-filled compasses are those set forth and described in U.S. Letters Pat. No. 4,175,333 to M. G. Kramer and owned by the assignee of this invention, and U.S. Pat. No. 4,236,316 to K. Suzuki.

SUMMARY OF THE INVENTION

Accordingly, it is an object of the present invention to provide for a novel and improved compass which is specifically adaptable for use as a part of a survival kit, and a compass which is extremely compact, but reliable and easy to use.

It is another object of the present invention to provide for a novel and improved compass which possesses the characteristics of a liquid compass but can be stored in a dry condition and then placed in a liquid environment for the purpose of taking a compass reading.

It is further object of the present invention to provide for a novel and improved compass which can be stored on a card containing instructions for its use and can be easily removed from the card and placed on a liquid in the palm of the hand to take accurate compass readings.

In accordance with the present invention, a liquid-type compass has been devised which comprises a lightweight thin, flat disk composed at least in part of magnetic material, the disk so constructed that it is capable of floating on a liquid surface or body so as to be movable to orient itself in a North-South direction, a flat support member provided for storing the disk when not in use, and means for releasably securing the disk to the support member. Preferably, the support member takes the form of a small flat card containing survival instructions as well as instructions for use of the compass, and the securing means may consist of nothing more than another disk attached to the card and provided with a bonding agent for releasably securing the compass disk to the card so as to make the disk readily accessible.

The above and other objects, advantages and features of the present invention will become more readily appreciated and understood from a consideration of the following detailed description of a preferred embodiment of the present invention when taken together with the accompanying drawings of a preferred embodiment of the present invention, in which:

BRIEF DESCRIPTION OF THE DRAWINGS

FIG. 1 is a front view in elevation of a preferred form of compass in accordance with the present invention illustrated in attached relation to a card;

FIG. 2 is a rear view of the card in showing a mounting disk on the card used in securing the preferred form of compass disk to the card; and FIG. 3 is a cross-sectional view taken about lines 3—3 of FIG. 1; and FIG. 4 is a perspective view illustrating the use of the compass in taking a reading.

DETAILED DESCRIPTION OF THE PREFERRED EMBODIMENT

Referring in detail to the drawings, there is shown in FIGS. 1 to 4 a preferred form f compass disk 10. In FIGS. 1 to 3, the disk 10 is illustrated in assembled relation to a support member 12. Preferably, the support member 12 is in the form of a thin, flat card of generally rectangular configuration and no larger than the size of a standard credit card so that it can be conveniently carried on one's person, such as, in a pocket, knapsack or wallet and occupy very little space. The support member or card 12 is designed to provide the necessary instructions for use of the disk 10 and to prevent loss of the disk when not in use. To this end, the card 12 may be composed of a paper or plastic and is provided with an opening 14 with a backing member in the form of a second disk 16. The disk 16 is firmly adhered to one surface of the card by application of a suitable pressure-sensitive adhesive to one surface of the disk which is to be secured to the card 12 with a portion of that surface exposed through the opening 14. The opening 14 is sized so that the disk 10 can be placed in the opening into direct engagement with the exposed surface of the disk 16 and adhesively secured thereto.

The disk 10 is preferably formed out of large sheets of a conventional magnetizable material, which can be divided into strips and magnetized by passing through a magnetizer so as to be oriented in a particular direction. The disks are formed by punching them out of the strip so as to result in a thin, flat but flexible disk of circular configuration and of a size less than the size of a dime. By virtue of the magnetic orientation of the disk, an upper surface 18 of the disk is provided with appropriate markings "N", "S", "E" and "W" and with some form of a pointer as indicated at 20 at the "N" marking. The markings would of course represent the four directions North, South, East and West, and it is important that the North marking be aligned so as to orient itself with the North magnetic pole when the disk is placed on a liquid surface. The opposite undersurface 22 of the disk is adhesively secured to the bottom support disk 16 as described and can be removed by lifting it away from the support disk 16 and the card 12.

As illustrated in FIG. 4, a compass reading is taken by placing the disk 10 on top of a body of liquid as designated at L. In FIG. 4, a small quantity of water is placed in the palm of the hand H to serve as the liquid. The surface tension or meniscus of the liquid is such that the disk 10 will float on the surface of the water and in this way be free to rotate or align itself until the pointer on the disk faces in the North direction. If the compass disk should sink into the liquid, it can be dried off and replaced until it floats on top of the water. In order not to distort the compass reading, a metal container should not be used. Once the necessary reading has been taken, the disk is dried off and replaced on the card as described.

It should be noted that the compass disk does not have to be buoyant but it is sufficient that it be extremely small, lightweight and capable of floating on the water due to the surface tension created between the water and edge of the disk. To this end, the disks may be formed out of various magnetizable materials having a thickness less than 1/32" and a diameter on the order of ¼" to ½".

It is therefore to be understood that various modifications and changes may be made in the construction and arrangement of parts comprising the preferred form of present invention without departing from the spirit and scope of the invention as defined by the appended claims and reasonable equivalents thereof.

I claim:

1. A compass assembly comprising:
   a thin, flexible disk member composed at least in part of magnetic material, said disk member capable of floating on a liquid body;
   a flat support card member provided with an opening therein; and
   means for releasably securing said disk member in said opening of said support card member when not in use, said disk being removable from said support card member for placement on a liquid surface when it is desired to take a compass reading, said releasable securing means defined by an adhesive surface portion disposed across said opening in said support card member, and said disk member inserted in said opening.

2. A compass according to claim 1, said disk member composed of a magnetic material, a pointer on one surface of said disk, and said magnetic material being oriented to align said pointer in a north-south direction when said disk is placed on a liquid surface.

3. A compass according to claim 2, said disk member being composed of strontium ferrite.

4. A compass according to claim 1, said releasable securing means including a second disk positioned on said support card member and provided with said adhesive surface.

5. In a compass, a flat member composed at least in part of magnetic material oriented to align itself with the north magnetic pole when freely suspended in a liquid, said member being in the form of a lightweight flexible member of a size which will fit in the palm of a hand, a pointer on said member, said member being of a density such that it will float on a small quantity of liquid placed in the palm of the hand and be free to rotate into alignment with the north magnetic pole, a flat support card member including an opening therein, and means for releasably securing said member in the opening of said support card member when not in use, said member being removable from said support card member for placement on a liquid surface in the palm of the hand when it is desired to take a compass reading, said releasable securing means defined by an adhesive surface portion disposed across said opening in said support card member, and said member inserted in said opening.

6. In a compass according to claim 5, said member composed of a flexible magnetic material, a pointer on one surface of said member and said magnetic material being oriented to align said pointer in a north-south direction when said member is placed on a liquid surface.

7. A compass according to claim 5, said member being in the form of a thin, flexible disk member composed of strontium ferrite, said releasable securing means including a second disk positioned across an opening on said support card member and provided with a pressure-adhesive surface.

* * * * *